(12) United States Patent
Jacques et al.

(10) Patent No.: US 6,447,416 B1
(45) Date of Patent: Sep. 10, 2002

(54) CAM DRIVE SYSTEM TENSIONER

(75) Inventors: Robert Lionel Jacques, Troy; Stephen B. Pass, Utica, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/664,376

(22) Filed: Sep. 14, 2000

(51) Int. Cl.$^7$ .............................. F16H 7/08; F16H 7/18
(52) U.S. Cl. ........................ 474/111; 474/140
(58) Field of Search .................. 474/111, 140, 474/117–118, 109, 101, 135

(56) References Cited

U.S. PATENT DOCUMENTS

| 5,055,088 A | * | 10/1991 | Cradduck et al. | ............ 474/111 |
| 5,425,680 A | * | 6/1995 | Young | ......................... 474/111 |
| 5,711,732 A | | 1/1998 | Ferenc et al. | ................ 474/111 |
| 6,238,311 B1 | * | 5/2001 | Cutting | ....................... 474/111 |

FOREIGN PATENT DOCUMENTS

| DE | 155933 | * 4/1939 | ................. 474/111 |
| GB | 155646 | * 12/1920 | ................. 474/111 |
| GB | 445152 | * 4/1936 | ................. 474/111 |
| GB | 989582 | * 4/1965 | ................. 474/111 |

* cited by examiner

Primary Examiner—David A. Bucci
Assistant Examiner—Marcus Charles
(74) Attorney, Agent, or Firm—Leslie C. Hodges

(57) ABSTRACT

A cam drive assembly for an automotive engine comprises a crankshaft sprocket mounted for rotation with a crankshaft, a camshaft sprocket mounted for rotation with a camshaft, and a chain rotatably operable between the crankshaft sprocket and the camshaft sprocket. A chain tensioner provides tension to the chain and is supported only by an engine block side wall. The chain tensioner is comprised of a stationary portion and a flexible spring portion supported thereto, and a nylon shoe fixed to the flexible spring portion to provide a contact surface for the chain. The stationary portion has a geometrical interlocking feature to mate with a complementary geometric feature in the engine block side wall to restrict upper and lower movement of the chain tensioner. The geometrical interlocking feature of the chain tensioner may be a concave retention portion, which fits over a complementary convex nub in the engine block side wall to restrict movement of the chain tensioner by part interference.

7 Claims, 5 Drawing Sheets

CAM DRIVE SYSTEM TENSIONER

TECHNICAL FIELD

The present invention relates to a chain tensioner for use with an automotive cam drive assembly.

BACKGROUND OF THE INVENTION

Chain tensioners are often employed to maintain a certain degree of chain tautness to reduce rattle noise associated with a slack chain in automotive applications such as drive and timing chains. In an internal combustion engine with an in-block camshaft, a cam drive assembly includes a crankshaft sprocket driving a camshaft sprocket via a timing chain. The cam drive is housed within a vertical cam drive cavity in the engine block. During engine operation, dynamic forces in the cam drive induce variations in chain tension, thereby necessitating a chain tensioner. The chain tensioner is typically mounted to a base plate or bracket which is bolted to the engine block. Therefore the engine block must include pre-drilled, pre-cast, or pre-formed holes to receive the mounting bolts. In some instances, this mounting scheme may be undesirable. For example, if a tensioner is to be retrofit to the engine after the engine has been designed and assembled, then drilling mounting holes in the block would be prohibited. Further, mounting bolts and brackets add piece cost and assembly cost to the design.

The need exists for a chain tensioner, packagable in a cam drive cavity, without the need for costly tensioner-specific fastening means.

SUMMARY OF THE INVENTION

The present invention is directed to a chain tensioner to be used in an automotive engine where the tensioner is retained by complementary geometrical features on the tensioner and the supporting structure of the engine. The geometrical features function to retain the tensioner in position without the need for mounting bolts and brackets, thereby reducing cost and mass. Additionally, this way of retaining the tensioner within an engine allows an engine to be later retrofit with a tensioner if desired without modification to the engine block itself.

The chain tensioner is comprised of a stationary portion and a flexible spring portion supported therewith and having a nylon shoe fixed to the flexible spring portion to provide a contact tension surface for the chain. The stationary portion includes a geometrical interlocking feature to mate with a complementary feature in the supporting engine block structure.

The tensioner, which is held in place by the engine geometry, may be located for assembly by existing fastener bolts which are already in the engine to mount another component and therefore may serve the dual function of locating the tensioner and fastening the other component to the engine.

DESCRIPTION OF THE PREFERRED EMBODIMENT

Figure 1:
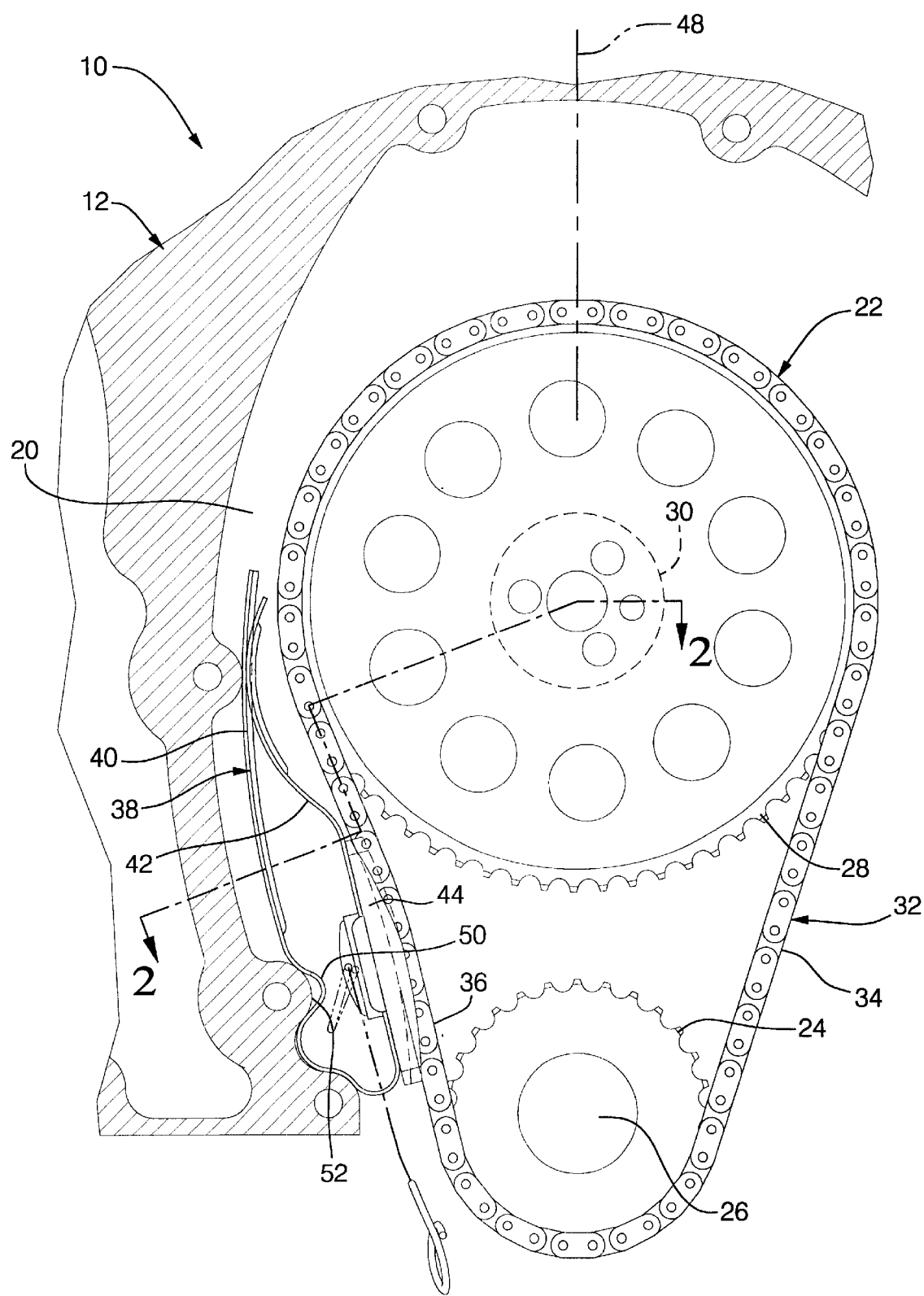
FIG. 1 is a front view of a chain tensioner installed in an internal combustion engine cam drive assembly.
Figure 2:
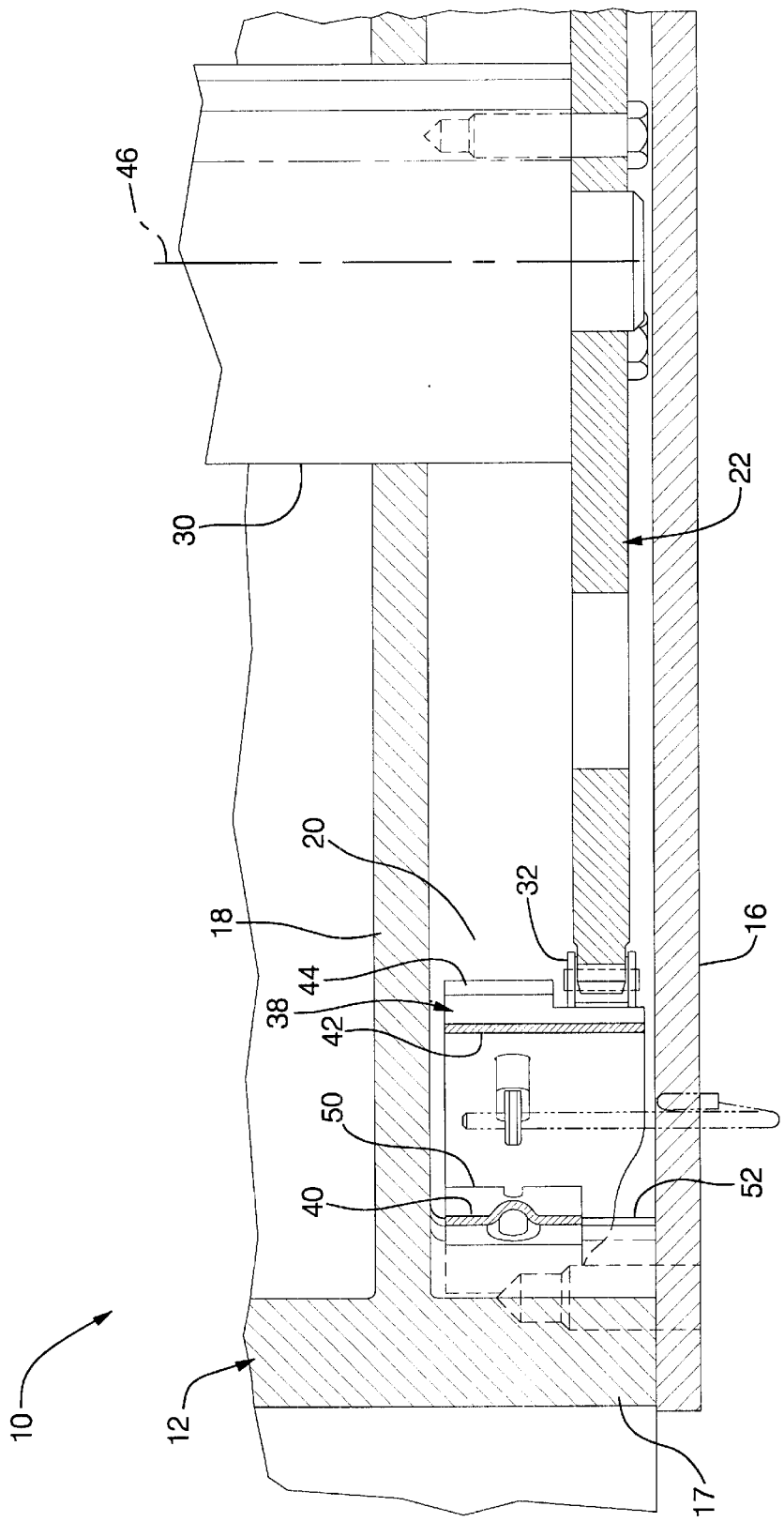
FIG. 2 is a sectional plan view taken along line 2—2 of FIG. 1.

FIGS. 1 and 2 illustrate an internal combustion engine shown generally as 10 comprising an engine block 12, housing pistons in cylinders, not shown, and a cylinder head, not shown, mating with an upper surface of the block 12 to close off the cylinders. As depicted in FIG. 2, a timing chain cover 16 is secured to the block 12 at an engine block side wall 17 to cover the front face wall 18 of the block, and thereby defines a vertical cam drive cavity 20 within which a cam drive assembly 22 is disposed.

The cam drive assembly 22 includes a crankshaft sprocket 24, mounted for rotation with a crankshaft 26, and a camshaft sprocket 28, mounted for rotation with an in-block camshaft 30, drivingly interconnected via a timing chain 32. The chain tension may vary considerably due to camshaft- and crankshaft-induced torsional vibrations. As the chain 32 circulates, the span of chain leaving the camshaft sprocket 28 and entering the crankshaft sprocket 24 forms a taut portion 34 of chain 32. In contrast, the span of chain leaving the crankshaft sprocket 24 and entering the camshaft sprocket 28 forms a slack portion 36 of chain 32.

To reduce the tendency for any slack in the chain 32 and thereby to provide a more consistent chain tension, the cam drive assembly 22 also includes a chain tensioner 38, to act upon the slack portion 36 of the chain. As shown in a first embodiment in FIG. 3, the tensioner 38 is thin-gage spring-steel configured as a hook where the hook has supportive stationary portion 40 and flexible spring portion 42 which translates along the stationary portion. The flexible spring portion 42 basically pivots relative to the stationary portion 40 about the hook end of the tensioner. A shoe 44 is fixed to the flexible spring portion 42 and provides a wear-resistant contact surface for the chain 32. The shoe 44 may be any suitable wear-resistant material such as nylon. The tensioner 38 must be able to withstand high engine temperatures and an oil environment.

The tensioner 38 relies upon part interference between the engine block 12 and the tensioner to maintain the tensioner in position. Specifically, the vertical cam drive cavity 20 houses and restrains the tensioner 38, as best shown in FIG. 2. The cavity 20 is defined by the timing chain cover 16, the adjacent engine block side wall 17, and the front face wall 18 of the engine block 12, approximately parallel to the timing chain cover. Forward movement of the tensioner 38 along the longitudinal camshaft axis 46 is limited by the forwardly adjacent timing chain cover 16, which encloses the cam drive assembly 22. Rearward movement of the tensioner 38 is limited by the rearwardly adjacent front face wall 18 of the engine block 12, which defines the rear of the cam drive cavity 20.

To restrict upper and lower movement of the tensioner 38 along the vertical axis 48, the stationary portion 40 of the tensioner includes a geometrical interlocking feature 50, which mates with a complementary geometric feature 52 in the supporting structure. In FIG. 1, the tensioner geometrical interlocking feature 50 is shown as a concave retention portion, fitting over a complementary convex nub 52 in the block side wall 17. The interlocking of the concave portion 50 to the stationary convex nub 52 of the inner surface of the block side wall 17 retains the tensioner 38 in its vertical location, and prohibits upward and downward movement. More particularly, the convex nub 52 of the block 12 acts as a reaction surface to resist the upward movement of the tensioner 38 induced by the timing chain rotation against the tensioner shoe 44. The tensioner 38 is essentially trapped in its proper location by physical part interference between the tensioner and the engine supporting structure or engine block 12 without the need for securing bolts. Therefore the tensioner 38 may take on many forms as long as it has a geometrical interlocking feature 50 to complement a geometric feature 52 in the supporting structure.

Figure 4:
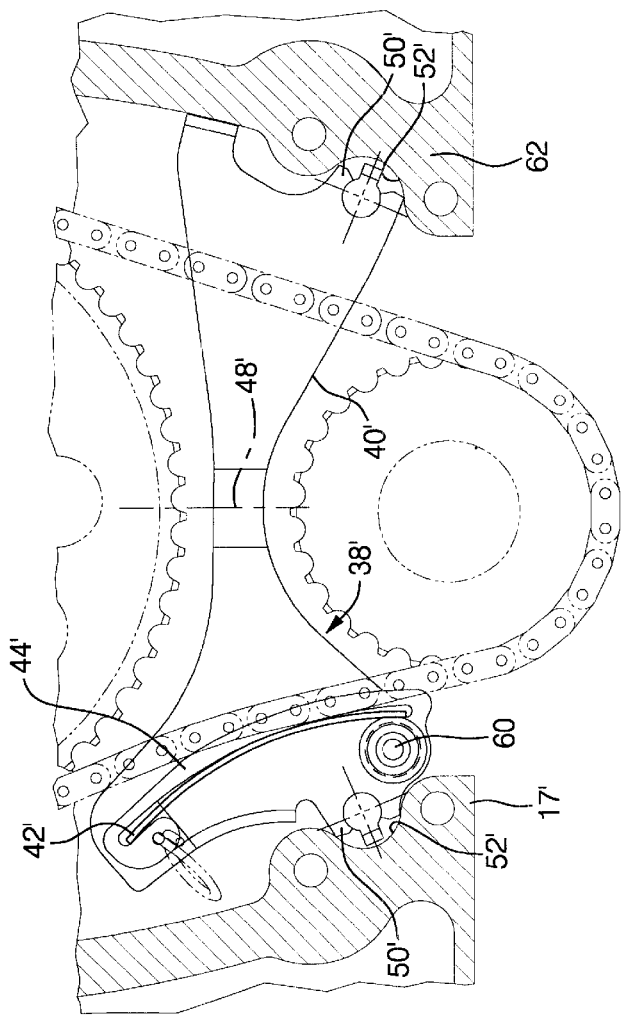
FIG. 4 is a front view of a second chain tensioner installed in an internal combustion engine cam drive assembly.
Figure 5:
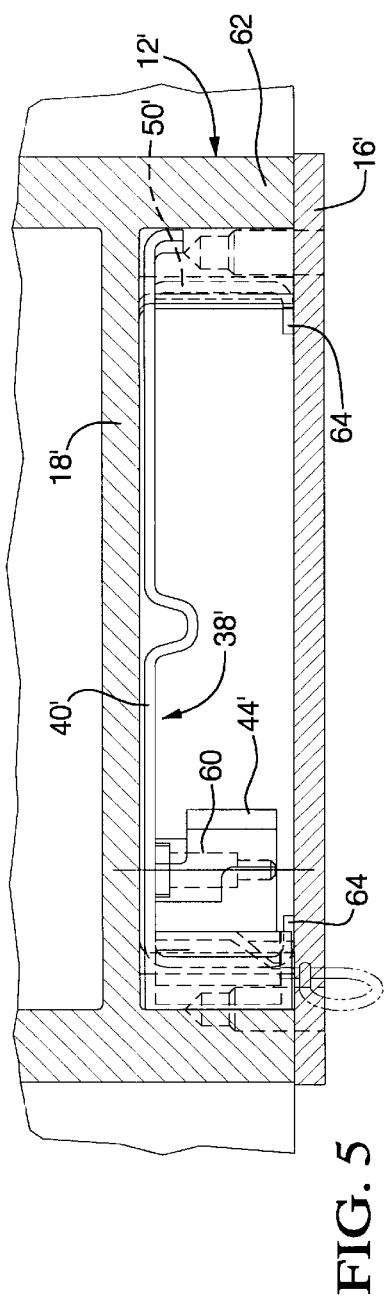
FIG. 5 is a sectional plan view of FIG. 4.

A second form of tensioner having the inventive retention features is shown in FIGS. 4 and 5, with like components designated with a prime. The tensioner 38' includes a supportive stationary portion 40' formed as a stamped steel plate and a flexible spring portion 42' embedded in a nylon shoe 44'. The flexible spring portion 42' and shoe 44' pivot about the stationary portion 40' on a pivot pin 60.

The stationary plate 40' extends from a first engine block side wall 17' to the opposing side wall 62. To restrict upper and lower movement of the tensioner 38' along the vertical axis 48', the stationary portion 40' includes a geometrical interlocking feature 50' on both sides adjacent the block side walls 17' and 62. The feature 50' extends radially forward of the stationary plate 40' to fit within and to be retained by a complementary geometric feature 52' within the block side walls 17' and 62, as shown in FIG. 4.

An inwardly extending flange 64 extends from the geometrical interlocking feature 50' approximately parallel to and adjacent to the timing chain cover 16'. This close adjacency limits forward movement of the tensioner 38'. The stationary plate portion 40' is adjacent to the front face wall 18' of the engine block 12' to limit rearward movement of the tensioner 38'.

Upon installation of the tensioner 38 of FIG. 1 into the engine block 12, the tensioner is compressed between the timing chain 32 and the inside side wall 17 of the cavity 20, housing the tensioner. The preload of the tensioner 38 against the chain 32 is predetermined to provide the desired amount of tension control over the timing chain. During operation, dynamic forces create the tendency for chain slackness. As this occurs, the flexible spring portion 42 translates down the stationary portion 40 and the hook shape of the tensioner 38 becomes more pronounced as it increases the tension upon the chain 32.

Figure 3:
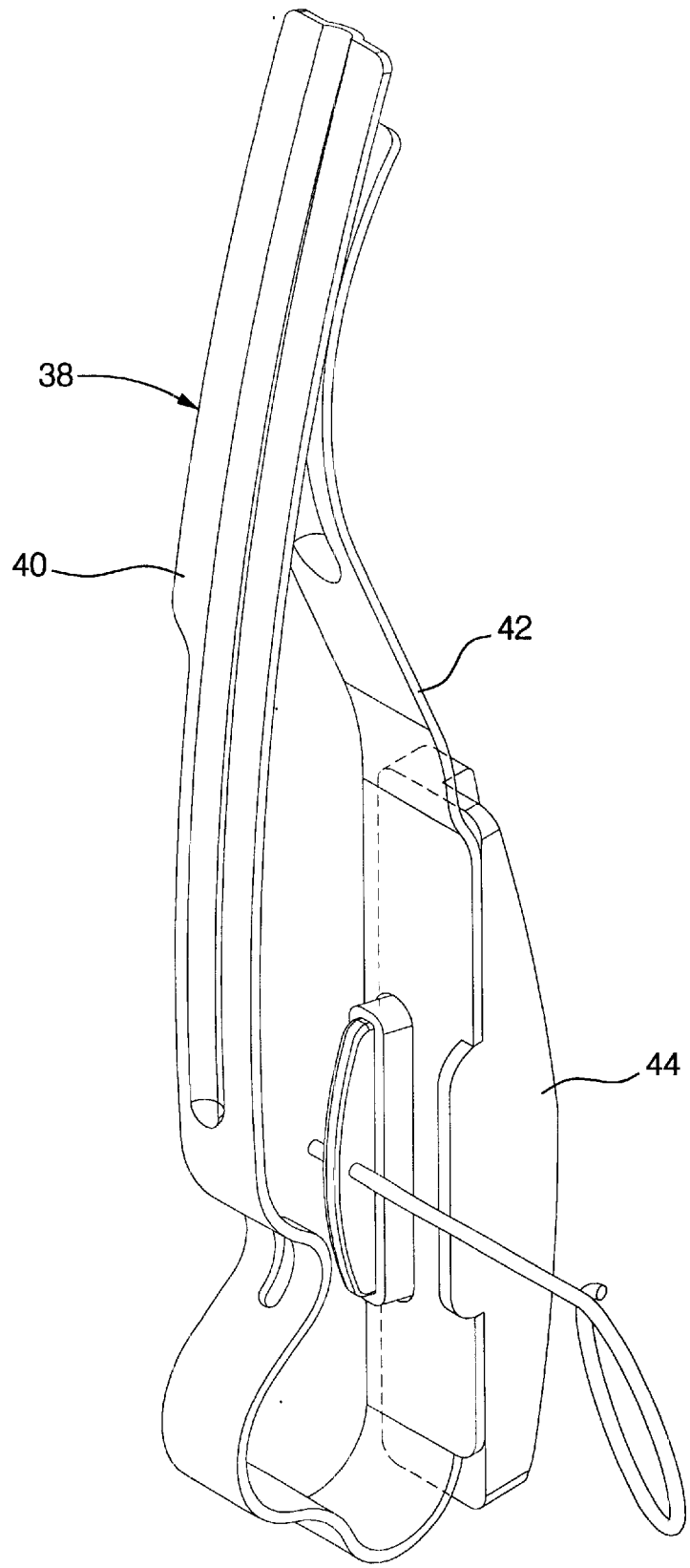
FIG. 3 is an isometric view of the chain tensioner of FIG. 1.
Figure 6:
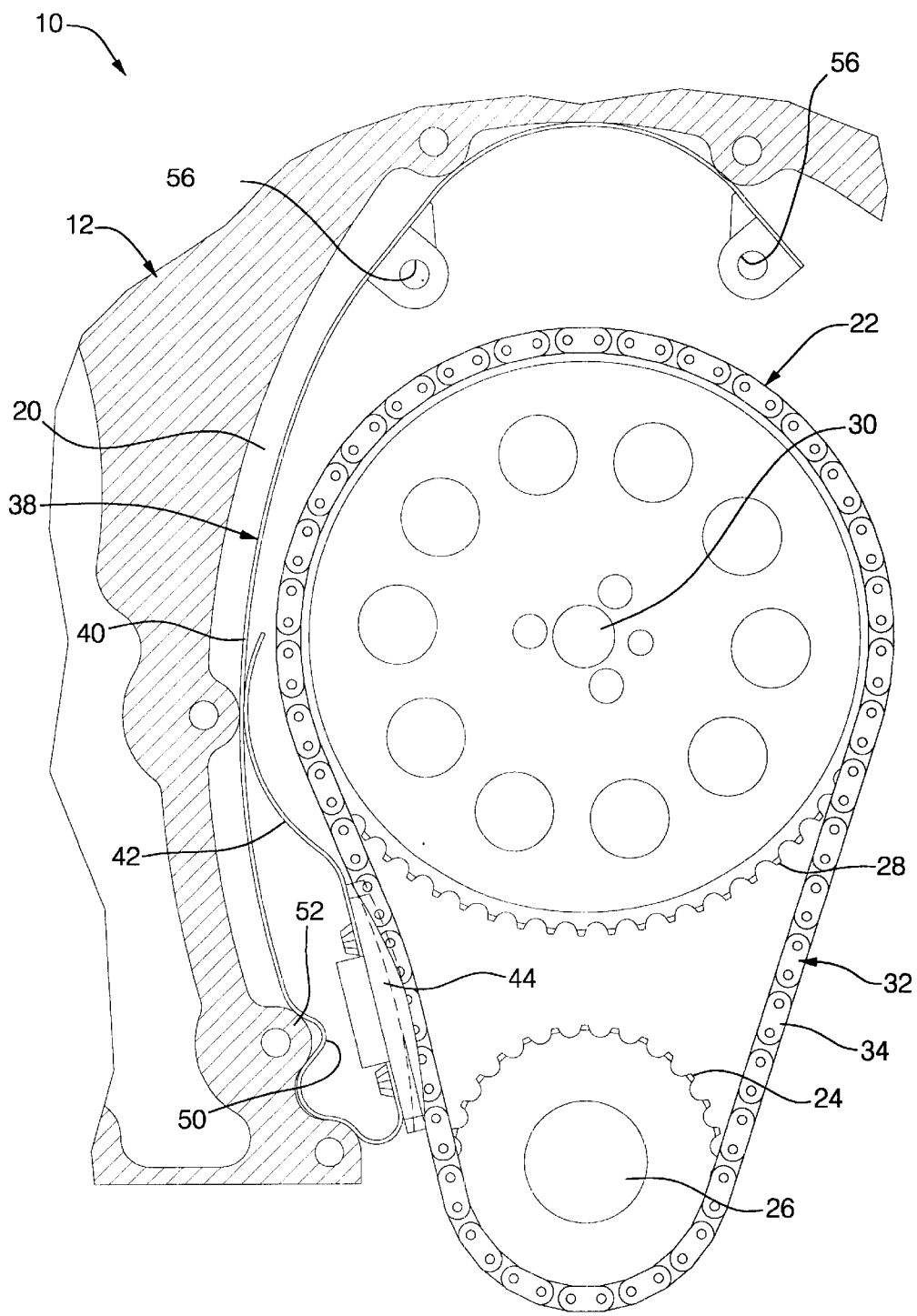
FIG. 6 is a front view of a second embodiment of a chain tensioner installed in an internal combustion engine cam drive assembly.

To facilitate locating the tensioner 38 of FIGS. 1–3, within the cam drive cavity 20, a locating means 56 may be included with the present invention as shown in FIG. 6. As described above, the tensioner 38 is trapped in its proper location by the geometry of the cavity 20, but here the tensioner includes locating holes 56 which align with pre-existing fasteners, not shown, that exist in the engine for a separate, unrelated purpose. For example, the fasteners may secure a balance shaft thrust plate and would be required despite the use of a tensioner. Here, though, the fasteners serve the second purpose of locating the tensioner 38 for assembly. The fasteners do not take any of the reactive forces and are simply used to facilitate proper locating and installation of the tensioner 38.

There are many variations in which the tensioner of the present invention may be formed to take advantage of existing engine geometry such that the tensioner may be retained in any existing engine cavity without the use of hold-down bolts and mounting brackets. This is a cost efficient solution for incorporating a chain tensioner into a new engine and also provides a feasible alternative for in-service engines.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. A chain tensioner for providing tension to a chain of a cam drive assembly in an engine block of an internal combustion engine, comprising:

a stationary portion and a flexible spring portion configured as a hook, and a shoe fixed to said flexible spring portion to provide a contact surface for said chain, said stationary portion having an integral geometrical interlocking feature to mate with an integral complementary geometrical feature of said engine block to restrict movement of said chain tensioner, wherein said integral geometrical interlocking feature of said stationary portion and said integral complementary geometrical feature of said engine block are the sole locking or fastening elements retaining said stationary portion of said chain tensioner in position with respect to said engine block.

2. A chain tensioner, as defined in claim 1, wherein said geometrical interlocking feature of said stationary portion is a concave retention portion and said complementary geometric feature in said engine block is a complementary convex nub which fits within said concave retention portion to restrict movement of said chain tensioner by part interference.

3. A chain tensioner, as defined in claim 2, wherein said chain tensioner is closely adjacent to a timing chain cover to restrict movement in a forward direction, and is closely adjacent to a front face wall of said engine block to restrict movement in an opposing rearward direction.

4. A chain tensioner, as defined in claim 3, further comprises a locating means to locate said chain tensioner in said engine block for assembly.

5. A cam drive assembly for an internal combustion engine, comprising:

a crankshaft sprocket mounted for rotation with a crankshaft in an engine block, defining a crankshaft axis, a camshaft sprocket mounted for rotation with a camshaft in said engine block, a chain rotatably operable between said crankshaft sprocket and said camshaft sprocket, and a fastenerless chain tensioner having an integral geometrical interlocking feature that mates with an integral complementary geometrical feature of a side wall of said engine block to restrict upper and lower movement of said chain tensioner, wherein said integral geometrical interlocking feature and said integral complementary geometrical feature are the sole locking or fastening elements retaining said stationary portion of said chain tensioner in position with respect to said side wall of said engine block.

6. A cam drive assembly, as defined in claim 5, wherein said geometrical interlocking feature of said chain tensioner is a concave retention portion and said geometric feature in said engine block side wall is a complementary convex nub which fits within said concave retention portion to restrict movement of said chain tensioner by part interference.

7. A cam drive assembly, as defined in claim 6 wherein said chain tensioner is closely adjacent to a timing chain cover to restrict movement in one direction, and is closely adjacent to a front face wall of said engine block to restrict movement in a second, opposing direction.

* * * * *